(12) United States Patent
Stoffel

(10) Patent No.: US 10,245,880 B2
(45) Date of Patent: Apr. 2, 2019

(54) PRESS PLATE OR ENDLESS BELT WITH RFID TRANSPONDER

(71) Applicant: HUECK Rheinische GmbH, Viersen (DE)

(72) Inventor: Wolfgang Stoffel, Kempen (DE)

(73) Assignee: HUECK Rheinische GmbH, Viersen (DE)

( * ) Notice: Subject to any disclaimer, the term of this patent is extended or adjusted under 35 U.S.C. 154(b) by 343 days.

(21) Appl. No.: 15/120,211

(22) PCT Filed: Mar. 17, 2015

(86) PCT No.: PCT/EP2015/055511
§ 371 (c)(1),
(2) Date: Aug. 19, 2016

(87) PCT Pub. No.: WO2015/140140
PCT Pub. Date: Sep. 24, 2015

(65) Prior Publication Data
US 2017/0072736 A1    Mar. 16, 2017

(30) Foreign Application Priority Data

Mar. 19, 2014  (EP) .................................... 14001006

(51) Int. Cl.
*B29C 43/58*  (2006.01)
*B44B 5/02*  (2006.01)
(Continued)

(52) U.S. Cl.
CPC .............. *B44B 5/026* (2013.01); *B29C 43/58* (2013.01); *B30B 5/04* (2013.01); *B30B 15/062* (2013.01);
(Continued)

(58) Field of Classification Search
CPC ... B29C 43/48; B29C 43/58; B29C 2043/366; B29C 59/02; B29C 59/04; B30B 5/04;
(Continued)

(56) References Cited

U.S. PATENT DOCUMENTS 6,047,579 A * 4/2000 Schmitz .................. B30B 15/26
                                                                    483/28
7,014,443 B2 * 3/2006 Hinzpeter ............. B30B 11/005
                                                                    425/167
(Continued)

FOREIGN PATENT DOCUMENTS

CA    2 673 270 A1    7/2008
CA    2 709 904 A1    7/2009
(Continued)

OTHER PUBLICATIONS

International Search Report of PCT/EP2015/055511, dated Apr. 28, 2015.

*Primary Examiner* — James P Mackey
(74) *Attorney, Agent, or Firm* — Collard & Roe, P.C.

(57) ABSTRACT

The invention relates to a press plate 1 or endless belt comprising a body with a stamping surface 2 and at least one external surface 4 which is provided not for stamping, wherein the press plate 1 or endless belt is equipped with an RFID transponder 6 which has a memory. A data record which identifies the press plate 1 or endless belt or use and/or manufacturing data of the press plate 1 or endless belt is stored in the memory. The acquisition of use and/or manufacturing data permits the storage of a precise history of a press plate 1 or endless belt and wireless transmission of this history to a receiver. On the basis of the use data, billing can be carried out which depends not only on the duration of use but also on the press strokes actually carried out.

11 Claims, 2 Drawing Sheets

Figure 1:
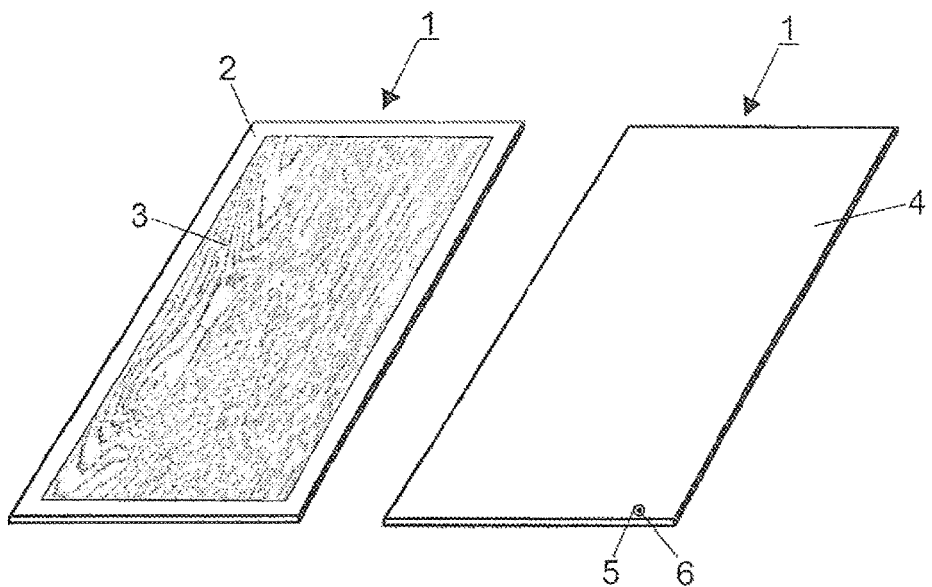

(51) Int. Cl.
- *B44B 5/00* (2006.01)
- *B30B 5/04* (2006.01)
- *B30B 15/06* (2006.01)
- *B29C 59/04* (2006.01)
- *B29C 43/48* (2006.01)
- *B29C 59/02* (2006.01)
- *B29C 43/36* (2006.01)

(52) U.S. Cl.
CPC .............. *B44B 5/00* (2013.01); *B44B 5/0052* (2013.01); *B29C 43/48* (2013.01); *B29C 59/02* (2013.01); *B29C 59/04* (2013.01); *B29C 2043/366* (2013.01)

(58) Field of Classification Search
CPC ....... B30B 15/062; B44B 5/00; B44B 5/0052; B44B 5/026
USPC ....... 425/169, 371, 373, 385, 394, 403, 470, 425/471
See application file for complete search history.

(56) References Cited

U.S. PATENT DOCUMENTS

| | | |
|---|---|---|
| 8,246,775 B2 | 8/2012 | Ernst |
| 8,261,803 B2 | 9/2012 | Espe |
| 2007/0193910 A1 | 8/2007 | Ernst |
| 2010/0276919 A1 | 11/2010 | Dietemann |

FOREIGN PATENT DOCUMENTS

| | | |
|---|---|---|
| CN | 101024314 A | 8/2007 |
| CN | 201084322 Y | 7/2008 |
| CN | 201965645 U | 9/2011 |
| DE | 102 27 649 A1 | 1/2004 |
| EP | 1 721 742 A2 | 11/2006 |
| EP | 1 803 548 A1 | 7/2007 |
| EP | 2 189 276 A1 | 5/2010 |
| RU | 2010130361 A | 2/2012 |
| RU | 2446465 C2 | 3/2012 |

* cited by examiner

PRESS PLATE OR ENDLESS BELT WITH RFID TRANSPONDER

CROSS REFERENCE TO RELATED APPLICATIONS

This application is the National Stage of PCT/EP2015/055511 filed on Mar. 17, 2015, which claims priority under 35 U.S.C. § 119 of European Application No. 14001006.7 filed on Mar. 19, 2014, the disclosure of which is incorporated by reference. The international application under PCT article 21(2) was not published in English.

The invention relates to a press plate or endless belt, comprising a flat body with a stamping surface and at least one external surface which is provided not for stamping.

Press plates or endless belts known from the prior art are used to press composite panels with a laminate structure. The composite panels are usually flooring laminates, wall or ceiling cladding panels and panels for the furniture industry, which are intended as an imitation of real wood surfaces or other natural surfaces. A flooring laminate, for example, comprises several core papers, an alpha cellulose paper and optionally an overlay paper, which are pressed together with a substrate layer, the paper layers being impregnated with a resin and then pressed with one another in a press by means of a press plate or endless belt at a raised temperature. The alpha cellulose paper is provided with print simulating a natural surface, for example a wood or stone surface. In the furniture industry, additional fiber panels or plastic panels may be used, on which an alpha cellulose paper impregnated with a resin, and optionally an overlay paper impregnated with a resin are disposed. This stack is likewise pressed in a press by means of a press plate or endless belt at a raised temperature. In most applications, melamine resin (melamine formaldehyde) is used, which is a thermosetting plastic and which sets due to the raised temperature during the pressing operation so that the different layers are firmly bonded to one another. Alternatively, prepregs comprising alpha cellulose papers and overlay and/or underlay papers may be produced, which are subsequently glued to a substrate layer or bonded in some other way.

Another option known from the prior art is to provide the pressed materials with a surface structure during the pressing operation. To this end, the press plate or endless belt in turn has a surface structure in the stamping surface, the negative of which is transferred to the surface of the composite panel during the pressing operation. Since the resin sets during the pressing operation, the surface structure is permanently transferred to the surface of the composite panel. Due to the surface structure, natural surfaces can be even more effectively depicted by the materials produced in this manner. The most recent generation of such materials offer a feature whereby the surface structure is applied in register with the color pattern of the print on the alpha cellulose paper. Accordingly, differently colored areas can be provided with different surface structures so that a pore structure is embossed above the wood grains of a printed wood motif, for example. Furthermore, a corresponding surface structure can be embossed on top of a knot of a printed wood motif. Non-inherent properties of a natural surface can also be simulated, such as cracks, for example.

Press plates and endless belts are usually made from a stainless steel in the form of a flat body, the latter being subjected to high pressing pressures and temperatures during the pressing operation. Furthermore, press plates or endless belts must have a certain temperature conducting capacity to enable heat to be transferred from the press plates or endless belts to the composite panel. The structured stamping surface of press plates or endless belts is usually provided with a metal coating, for example a coating of chromium, which increases the hardness of the stamping surface, and the surface of the composite panel may also be provided with a desired degree of gloss. The increased hardness obtained as a result of a metal coating increases the number of pressing operations that are possible before the structure of the stamping surface becomes too worn. This wear occurs in particular if the overlay paper impregnated with resin is additionally provided with solid particles, which are usually corundum particles, with a view to reducing abrasion of the pressed composite panels and thus increasing the service life of these composite panels. Another known approach is to use a minding process to harden the structured stamping surface of press plates or endless belts or to provide a plasma coating.

The structure of the stamping surface itself is produced by means of a mask of etch resist and an etch bath or by surface removal using a laser or water jet. In order to obtain a high structuring accuracy of the stamping surface, it has proved to be of advantage to apply the mask of etch resist to the stamping surface using a digitally controlled print head and the etch resist used is preferably a UV-setting varnish. The press plate or endless belt is then transferred to an etch bath where material is removed from the areas that are not covered by the etch resist mask, thereby creating a surface structure. The process of producing the surface structure of the stamping surface by means of an etch resist mask may take place in several cycles, in which case the etch resist mask is applied to an already previously structured stamping surface in the second and all subsequent cycles. In this manner, a coarse structure can be initially produced and then a fine structure or a surface structure with several structuring depths. The use of a laser is also suitable for producing a detailed surface structure of the stamping surface, at least during the first work operation, because controlling the focal point enables material to be removed from the stamping surface with almost pinpoint accuracy. The use of a water jet to produce the surface structure of the stamping surface is another alternative to an etch bath, which in particular has the advantage of incurring relatively low production costs because it neither involves the use of large quantities of etching chemicals which then have to be disposed of, nor does it involve the provision of laser apparatuses requiring energy consumption. However, the disadvantage of surface structuring by means of a water jet is that the structuring accuracy is currently not as good as that of etching and laser structuring because a water jet cannot be precisely focused. However, both methods can be used to produce at least coarse structuring, whilst etching technology can then be used for fine structuring.

Due to the complex and expensive structuring processes and surface treatments involved in producing the stamping surface, press plates or endless belts of the generic type come at a high price. This applies in particular to press plates and endless belts, the surface structures of which are very detailed and naturally realistic. Due to the use of special, materials and final surface treatments of the stamping surface, press plates or endless belts are also suitable for numerous pressing operations before they exhibit perceptible signs of wear. Such press plates or endless belts can be used to run up to 40,000 pressing operations. If a press plate or endless belt becomes worn to the degree that it results in a perceptible loss of embossing quality on the surface being embossed, the press plate or endless belt is usually returned to the manufacturer who reproduces the surface structure of the press plate or endless belt to the original quality. To this end, the manufacturer has to make careful and expensive provision to store the press plates or endless belts because, due to limited capacities, he has to hold numerous press plates or endless belts in storage for reprocessing at any one time.

In the case of press plates or endless belts with a very long service life, in other words very good anti-wear properties due to a specific surface treatment, production can be very complex and expensive. For this reason, one option is to rent out the press plates or endless belts, in which case the client pays tor the number of pressing operations undertaken. To this end, it is necessary to record, the number of pressing operations and correlate the press plate or endless belt with a specific client.

Against this background, the objective of this invention is to propose a press plate, or endless belt which, is easily identifiable. Another objective is to enable the usage actions carried out to be recorded.

To achieve the first objective, the press plate or endless belt has at least one RFID transponder, and the RFID transponder is equipped with an electronic memory which the RFID transponder is able to read and/or can write to, and at least one data record identifying the press plate or endless belt is stored in the memory. Other advantageous embodiments of the invention are defined in the dependent claims.

As proposed by the invention, the press plate or endless belt has an RFID transponder which co-operates with a memory integrated therein. In addition to an antenna and an analog transmitter and receiver circuit, also known as a transceiver (artificial word created from transmitter and receiver), commercially available RFID transponders also have a digital circuit and a memory. The digital circuit might be a microcontroller, the complexity of the RFID transponder being a significant factor in determining the price. Some RFID transponders have a very small memory in which only a data record in the form of a serial number uniquely identifying the RFID transponder is stored. Other RFID transponders have a larger memory in which additional data can be stored. A press plate or endless belt can be easily identified by means of an RFID transponder because the memory of the RFID transponders can easily be read by means of a reading device. The susceptibility to errors of such an electronic identification system is significantly lower than an identification: system of press plates or endless belts by means of an engraved serial number. The logistics of press plates or endless belts proposed by the invention are made much simpler and less susceptible to errors than those of the press plates or endless belts known from the prior art. RFID transponders which have an internal memory on which use data pertaining to the press plate or endless belt for its entire service life or a part thereof and/or manufacturing data of the press plate or endless belt can be stored in addition to the serial number of the RFID transponder are also suitable for the press plate or endless belt proposed by the invention.

Use data and/or manufacturing data of the press plate or endless belt can be stored on the memory of the RFID transponder. The data to be stored in the memory is transmitted by an RF transmitter and received by the RFID transponder, which then writes the received data to the memory. However, the RFID transponder is also able to read data from the memory and transmit it to an RF receiver. The data can therefore be stored in the memory and read from the data stored in the memory wirelessly. RFID transponders of very small dimensions are already commercially available so that a press plate or endless belt can be equipped with one at little cost and specially trained staff are not needed for the purpose of fitting on the press plates or endless belts.

The use data stored in the memory is selected from the group of data comprising pressing pressure, pressing duration, temperature of the stamping surface, material of the composite panel, time of a pressing operation, number of pressing operations, name and address of one or more persons or companies. In addition, manufacturing data of the press plate or endless belt can be stored in the memory, the manufacturing data being selected from the group of data comprising materials of the body, coating materials of the stamping surface, information about surface treatments of the stamping surface and information about the structure of the stamping surface. This use data permits a complete reconstruction of usage actions carried out with a press plate or endless belt and thus enables billing on the basis of press strokes actually carried out with the press plate or endless belt.

Furthermore, the operator and/or user of the press plates or endless belts can also transmit data to the RFID transponder, for example time of the pressing, process and information about the quality of the composite panels to be pressed, and this data can be stored in the memory. The manufacturing data enables an exact record of the original quality of the press plate or endless belt to be kept, in other words prior to carrying out the first usage action, duration of use and deployment times.

The press plate or endless belt may be provided with a blind bore or recess in which the RFID transponder is disposed. A blind bore can easily be provided, for example in the peripheral region of the press plate or endless belt, and can be made without any great complexity by known methods. The disposition and fixing of the RFID transponder in the blind bore protects it from mechanical damage during use of the press plates or endless belts. The blind bore is preferably provided on an external surface of the press plate or endless belt that is not intended for embossing.

Furthermore, thermal insulation may be provided between the RFID transponder and the press plate or endless belt, which protects the RFID transponder from becoming too hot and thus enables a sufficiently long service life to be obtained.

Based on another embodiment of the invention, the RFID transponder may comprise a voltage and current source which supplies the RFID transponder with voltage and current. In principle, there are three different types of RFID transponder. These are passive RFID transponders, semi-active RFID transponders and active RFID transponders. Of these, passive RFID transponders do not have a separate voltage and current supply but are supplied with energy by the RF field irradiated by a transmitter and communicate with a receiver by modulating the irradiated RF field, and the transmitter can simultaneously be configured as a receiver. Passive RFID transponders may be based on a very small design and have a long service life. However, data can be transmitted from a passive RFID transponder to a receiver across only very short ranges because passive RFID transponders do not have a separate transmitter. Semi-active RFID transponders are equipped with a current and voltage source but not with a separate transmitter so that semi-active RFID transponders also communicate with a receiver by modulating the RF field irradiated by a transmitter. The current and voltage source is used to supply the digital circuit, which may be configured as a microcontroller, and optionally the memory, if it is a volatile memory, with current and voltage. Since modulation of an irradiated RF field is assisted by the separate current and voltage source in the case of semi-active RFID transponders, the range of semi-active RFID transponders is significantly greater than that of passive RFID transponders. Active RFID transponders, on the other hand, have a voltage and current source in the form of a battery and a separate transmitter which, in addition to the digital circuit, which can be configured as a microcontroller, and the memory, if it is a volatile memory, can be supplied by the current and voltage source. The transmission range of an active RFID transponder is therefore significantly longer than that of semi-active RFID transponders. Accordingly, both passive and semi-active as well as active RFID transponders may be used with the press plate or endless belt as proposed by the invention.

Passive RFID transponders are preferably used to identify the press plate or endless belt, whereas semi-active or active RFID transponders with a separate voltage source can be used for actively storing data and reading data from a memory and for this reason are perfect for recording the use data during use.

Based on another specific embodiment of the invention, the press plate or endless belt may have at least one temperature sensor which co-operates with the RFID transponder so that measurement values can be stored in the memory of the RFID transponder. In this case, the at least one temperature sensor is disposed on an external surface of the body that is not intended for embossing and measures the temperature of the body and transmits it to the memory. Furthermore, at least one temperature sensor may be recessed in the body. Based on another embodiment, a temperature sensor may be provided on the stamping surface of a press plate or endless belt, provided the body of the press plate or endless belt is not made entirely from metal and the body is therefore not very heat conductive. As explained above, the operation of pressing composite panels takes place at a raised temperature to enable the resin used to be cured. This means that every pressing operation can be recorded on the basis of a temperature measurement. The fact that the temperature measurement data is stored, in the memory therefore enables a reconstruction of the press strokes carried out with a press plate or endless belt.

Furthermore, the press plate or endless belt may have at least one pressure sensor which co-operates with the RFID transponder so that measurement values can be stored in the memory of the RFID transponder. In this case, a pressure sensor may be disposed on the stamping surface of a press plate or endless belt, thereby enabling the pressing pressure during a pressing operation to be recorded. The pressing pressure has a decisive effect on wear of the stamping surface of the press plate or endless belt. The temperature and/or pressure measurement data is stored in die memory and can be transmitted by the RFID transponder to an RF receiver. The RF transmitter and RF receiver can be, and usually are, integrated in a single device, the so-called reader.

Furthermore, an anti-collision process may be implemented in the RFID transponder, which enables a data transmission by multiple RFID transponders located within the RF field of a transmitter. From the prior art, the skilled person will be familiar with a series of anti-collision processes which can be used, with RFID transponders, amongst others the Aloha method and the Tree Walking method.

To provide objective control and reading of RFID transponders with memory media, all the electronic components are provided with a security tag. This being the case, the security tag is preferably applied to the area of the RFID transponder spanning the press plate or endless belt so that when checking the used press plates and endless belts, a check can be made to ensure that the seal is intact.

The invention will be explained in more detail with reference to the drawings.

Of these

Figure 2:
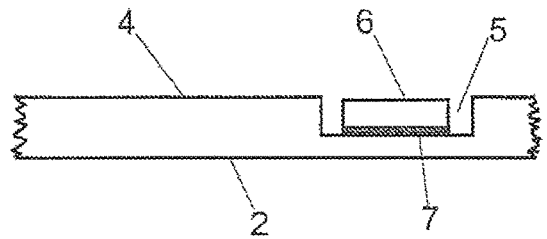
Figure 3:
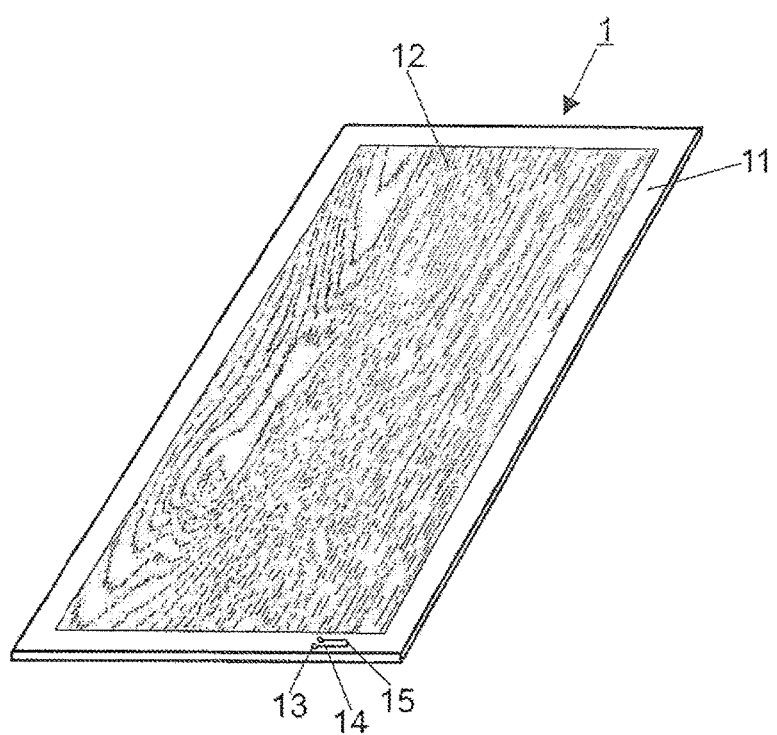

FIG. 1 shows two perspective views of a first embodiment of a press plate proposed by the invention, FIG. 2 illustrates a section through the press plate illustrated in FIG. 1 and FIG. 3 illustrates a second embodiment of a press plate proposed by the invention.

FIG. 1 illustrates two perspective views of a first embodiment of a press plate 1 proposed by the invention. In the left-hand part of the diagram in FIG. 1, the structured stamping surface 2 is facing the observer. The stamping surface 2 has a surface structuring 3 in the form of a wood grain. In the right-hand part of the diagram, the external surface 4 remote from the stamping surface 2 is facing the observer. Disposed in the peripheral region of the external surface 4 is a blind bore 5 in which an RFID transponder 6 is disposed and secured to the press plate. The RFID transponder comprises an integrated memory, to which the RFID transponder 6 can write and from which it can read. The disposition of the RFID transponder 6 in a blind bore 5 protects die RFID transponder 6 from mechanical damage during use of the very large press plates 1. Depending on the size of the RFID transponder 6, it may also be disposed in a blind bore or recess in an external surface on the side of the press plate 1. However, since press plates 1 have a thickness of only a few millimeters, a very small RFID transponder 6 will have to be used in this instance.

FIG. 2 illustrates a section through the blind bore 5 and RFID transponder 6 of the press plate 1 illustrated in FIG. 1. The blind bore 5 is disposed in the external surface 4 remote from the stamping surface 2. The RFID transponder 6 is disposed and secured inside the blind bore 5. Thermal insulation 7 is disposed between the press plate 1 and the RFID transponder 6 which protects the RFID transponder 6 from excessive heat and hence damage. The thermal insulation 7 may also extend across the side faces of the RFID transponder 6. The thermal insulation 7 may also completely fill the blind bore 5 in the region between the RFID transponder 6 and the side lace of the blind bore 5.

FIG. 3 is a perspective view illustrating another embodiment of a press plate 10 proposed by the invention. The press plate 10 comprises a stamping surface 11 with a surface structure 12 in the form of a wood grain. As with the first embodiment, the press plate 10 has a blind bore (not illustrated) disposed in the external surface remote from the stamping surface 11. An RFID transponder (not illustrated) is likewise disposed in the blind bore. Thermal insulation is disposed between, the RFID transponder and the press plate 10. By contrast with the first embodiment, the press plate 10 based on the second embodiment has a temperature sensor 13 and a pressure sensor 14 which are disposed in the peripheral, region of the stamping surface 11 and connected to the RFID transponder by measuring lines. The measuring lines are run through a bore 15 which is sealed with an appropriate material to prevent ingress by constituents of the composite panels to be pressed, such as melamine resin for example.

LIST OF REFERENCE NUMBERS

1 Press plate
2 Stamping surface
3 Surface structure

4 External surface
5 Blind bore
6 RFID transponder
7 Thermal insulation
10 Press plate
11 Stamping surface
12 Surface structure
13 Temperature sensor
14 Pressure sensor

The invention claimed is:

1. Press plate or endless belt, comprising a flat body with a stamping surface and at least one external surface which is provided not for stamping,
   wherein the press plate or endless belt has at least one RFID transponder, and the RFID transponder is equipped with an electronic memory which can be read and written to by the RFID transponder, and at least one data record identifying the press plate or endless belt is stored in the memory.

2. Press plate or endless belt according to claim 1, wherein the press plate or endless belt has at least one blind bore or recess in which the RFID transponder is disposed.

3. Press plate or endless belt according to claim 1, wherein a blind bore or recess is disposed in an external surface of the press plate or endless belt.

4. Press plate or endless belt according to claim 1, wherein the at least one RFID transponder is of an active, semi-active or passive type.

5. Press plate or endless belt according to claim 1, wherein thermal insulation is disposed between the RFID transponder and the press plate or endless belt.

6. Press plate or endless belt according to claim 1, wherein the RFID transponder comprises a voltage and current source.

7. Press plate or endless belt according to claim 1, wherein the RFID transponder is equipped with a security tag.

8. Press plate or endless belt according to claim 1, wherein the press plate or endless belt has at least one temperature sensor which co-operates with the RFID transponder so that measurement values can be stored in the memory of the RFID transponder.

9. Press plate or endless belt according to claim 1, wherein the press plate or endless belt has at least one pressure sensor which co-operates with the RFID transponder so that measurement values can be stored in the memory of the RFID transponder.

10. Press plate or endless belt according to claim 1, wherein use data and/or manufacturing data of the press plate or endless belt is stored in the memory.

11. Press plate or endless belt according to claim 10, wherein the use data is selected from the group of data consisting of pressing pressure, pressing duration, temperature of the stamping surface, material of a composite panel, time of a pressing operation, number of pressing operations, name and address of one or more persons or companies, and the manufacturing data is selected from the group of data comprising material of the body, coating materials of the stamping surface, information about surface treatments of the stamping surface and information about the structure of the stamping surface.

\* \* \* \* \*